E. WISCH.
METALLIC PACKING.
APPLICATION FILED SEPT. 18, 1911.
1,023,189.
Patented Apr. 16, 1912.
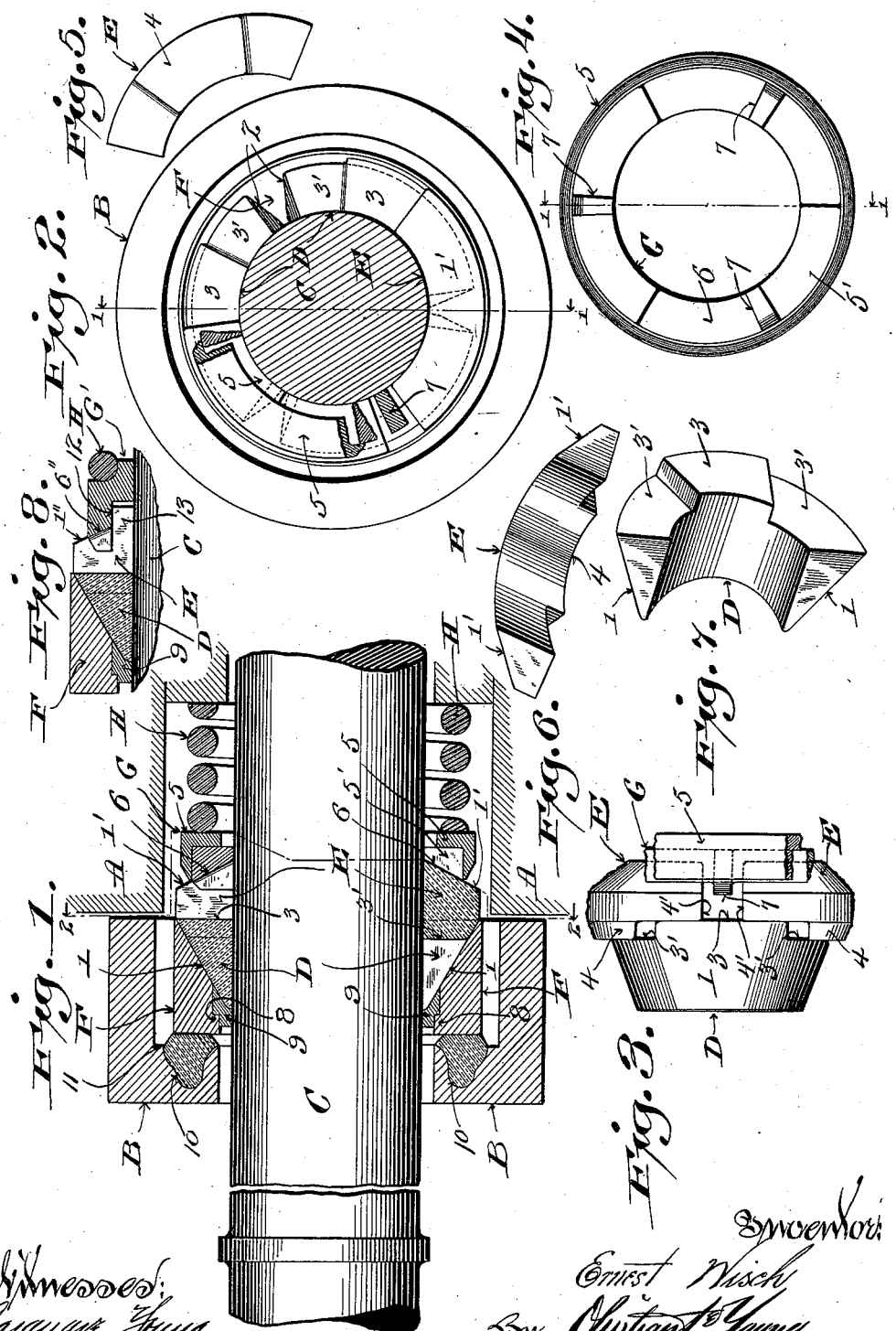

UNITED STATES PATENT OFFICE.

ERNEST WISCH, OF MILWAUKEE, WISCONSIN.

METALLIC PACKING.

1,023,189.  Specification of Letters Patent.  Patented Apr. 16, 1912.

Application filed September 18, 1911. Serial No. 649,942.

*To all whom it may concern:*

Be it known that I, ERNEST WISCH, a citizen of the United States, and resident of Milwaukee, in the county of Milwaukee and State of Wisconsin, have invented certain new and useful Improvements in Metallic Packing; and I do hereby declare that the following is a full, clear, and exact description thereof.

My invention refers to metallic packing, its primary object being to provide a simple, effective and lasting packing for piston rods or the like.

In that class of metallic packing to which my invention refers it is usual to employ two or more packing rings which are made up from sectors, each ring being in interlocked engagement with the other, the said nested rings being capable of construction about the piston rod by pressure exerted in either direction upon the end rings by suitable retaining rings. The sectors of the nested packing rings are spaced apart to permit contraction and these spaces are overlapped or closed by the adjacent ring. Owing to the fact that there is no provision for maintaining the spaces approximately equal between the ends of the respective sectors, in practice it has been demonstrated that through vibration or otherwise the ring sectors will rotate and close up the gaps between their ends to thus leave a single opening that is of sufficient area to expose one of the otherwise overlapped joints, whereby a leak channel is formed. Another detrimental feature of the above described packing is due to the fact that the various complicated sectors of the packing rings are so formed that it is possible to assemble them incorrectly with the result that the efficiency of the packing is impaired or lost. Thus said device requires a skilled mechanic to insure perfect assemblage.

With my improved metallic packing I provide means whereby the packing rings composed of sectors can only be assembled in their correct relations one with the other; to provide means for preventing the sector members from closing up and thereby exposing their joints in such manner as to produce a leak.

Another object is to provide means whereby the nested packing rings can be contracted to a minimum diameter, while at the same time tight lapped joints are formed when said packing rings are initially set to their normal greatest diameter; to provide means whereby the sectors are held against displacement by sagging incidental to their assemblage, and to provide the ends of the sectors of one packing ring with flared or angular faces whereby wear upon the inner bore thereof will grind off said ends so as to shorten the sectors and thus increase the contractible scope of the ring.

With the above and other objects in view my invention consists in certain peculiarities of construction and combination of parts as fully set forth hereinafter with reference to the accompanying drawings and subsequently claimed.

In the drawings Figure 1 represents a longitudinal central section of a packing embodying the features of my invention, the same being shown in position upon a piston which is suitably mounted in the head of a cylinder, the section being indicated by line 1—1 of Fig. 2; Fig. 2, a detailed cross-section of the same, the section being indicated by line 2—2 of Fig. 1; Fig. 3, a detailed elevation of the assembled packing with parts broken away to more clearly illustrate the arrangement of lapped joints; Fig. 4, a detailed face view of the inner retaining ring; Fig. 5, a detailed face view of one of the sectors, a series of which compose the inner packing ring; Fig. 6, a perspective view of the same; Fig. 7, a perspective view of one of the sectors which form part of the outer packing ring, and Fig. 8, a detail cross-section of a packing showing my preferred form of inner retaining ring.

Referring by characters to the drawings A represents the head of a cylinder or other mechanical element, B a cap or gland, and C a piston-rod which is adapted to reciprocate through an aperture in the cylinder head. Fitted about the piston-rod, are outer and inner packing rings, the same being formed from sectors D, E, respectively, whereby they may be readily assembled. The outer packing ring, comprising the sectors D, is provided with an angular tapered face 1 of approximately 30°, while the inner packing ring, comprising the sectors E, has an outer tapered face 1' which is disposed at an angle of approximately 60°. The angularly disposed faces 1, 1', of the packing rings are adapted to be engaged by female retaining rings F, G, respectively, whereby the nested packing rings are held in frictional engagement with the piston-rod, the said retaining rings being hereinafter described. The outer ring as shown is built up from three sectors D, of such circular area as to form intermediate spaces between the sector ends 2 to permit take-up, which end faces are flared and together form V-shaped open spaces as shown in Fig. 2. The sectors D of the outer ring have flat abutting inner faces 3 with depressions 3' that extend inwardly from the end of each sector to a predetermined point, the opposite depression 3' at the ends of each sector together forming a seat for a flat-faced tongue 4, which tongue projects from one of the sectors E of the series that form the inner or second packing ring, the said tongues 4 of each of the last mentioned sectors E being midway between the ends thereof. By this construction it will be apparent that when the outer ring is assembled about the piston-rod that the flat tongues 4 of the inner ring will bridge the broken joints between said outer ring sectors D, closing the same by a tongue and groove interlocked joint, whereby leakage is avoided, it being understood that the circular area of the flat tongues 4 is slightly less than the circular area of the depressed seat or groove therefor, (which groove is formed at the ends of the sectors D of the first packing ring) to thus permit contraction of said sectors as they are worn down.

In assembling the packing, a coiled spring H is first adjusted over the piston-rod, the same being seated within a cavity formed in the head A of the cylinder as shown and thereafter a retaining ring G is slipped into position against the coiled spring. This retaining ring G, as shown, is composed of a circular shell portion 5, which shell portion is preferably rectangular in cross-section and is of such inner circumference that it can readily be slipped over the cross-head shoulder of the piston-rod. A split-ring 5' is thereafter fitted into the shell, which ring is formed from sectors in sections for convenience in adjusting the same to the piston-rod, the inner diameter of the ring 5' being approximately the same as the outer diameter of said rod. The split-ring 5' and shell 5 together constitute the retaining ring G, which retaining ring is provided with an angularly disposed face 6, that corresponds with the outer angular face 1' of the inner packing ring, with which face it has engagement.

Projecting from the face 6 of the retaining ring G are a series of radial lugs 7, which lugs are fitted between the ends 4' of the spaced sectors E comprising the inner packing ring, the width of these ribs being such, in proportion to the width of the gap into which they are fitted, as to permit the inner packing ring sectors E to be contracted incidental to wear.

After the packing rings and inner retaining ring G are in place, an outer retaining ring F is adjusted to the angular face 1, of the outer packing ring sectors D, the retaining ring F being provided with an internal angular face which corresponds in pitch to that of the outer angular face 1 of said packing ring over which it is fitted. The inner circumference of the retaining ring F is approximately the same as that of the shell portion 5' of the inner retaining ring G, whereby said outer retaining ring can be slipped over the rod in the same manner as that previously described in connection with the inner retaining ring.

In order to fill the circular gap between the bore of the outer ring F and the piston-rod, said outer ring is provided with a shoulder 8 which forms a seat for a split ring 9, which split ring is provided with an angular face that conforms to the inner angular face of said retaining ring F. Thereafter the cap or gland B is fitted over the piston-rod and secured to the cylinder head in any suitable manner not shown. The gland B is provided with a circular recess 10 that forms a seat for a soft metal gasket 11, which gasket projects from the inner face of the gland and is provided with a straight edge that opposes the retaining ring F, the straight edge face of the gasket terminating with beveled corners.

From the foregoing description it will be seen that when the gland is securely seated, that the inner retaining ring G will be opposed by the force of the coiled spring in opposition to the retaining ring F, which ring is seated within said gland, and hence the compression force upon opposite sides of the retaining rings will cause the packing rings to contract tightly upon the face of the piston-rod, due to the wedging influence of the inclined faces of said retaining rings upon the inclined faces of the packing rings. Furthermore it will be understood that owing to the interposition of the ribs 7 between the ends of the sectors E of the inner packing ring, that said sectors cannot shift from their positions to expose the joints formed by the sectors D of the outer packing ring, which ring is also prevented from shifting to expose its respective joints by the interlocked or tongued engagement with said inner packing ring sectors. Attention is also called to the fact that owing to the great difference in pitch of the angular faces of the inner and outer packing rings and their tongue connections, that they cannot be assembled except in their correct relative positions. It will also be observed that the ends of the sectors D are flared slightly or wedge-shaped in such manner that when the bore of the sectors is worn away, the ends thereof will be ground off so as to shorten said sectors whereby the contractile capacity of the ring is automatically renewed.

While I have shown and described the inner retaining ring G as being composed of sections maintained by a shell portion, it is apparent that where a rod is to be packed that has no cross head shoulder thereon, said inner retaining ring G can be made in one piece without departing from the spirit of my invention, the essential element being that the aforesaid ring shall be provided with radial ribs which project into the spaces formed at the opposite ends of the sectors of the inner packing ring, whereby these sectors are held in their respective relative positions, to at all times maintain a perfectly tight joint bridging the gaps between the sectors D of the outer packing ring.

As shown in Fig. 8, G' indicates my preferred form of inner retaining ring, which retaining ring is provided with a rectangular circular groove forming a retaining cup 12 for an extension collar 13 of an inner packing ring E'. The angularly disposed face 1'' of the retaining ring E' in this instance extends from the collar portion 13 and is engaged by an angular face 6' that flares from the cup portion 12 of said retaining ring. The angularly disposed face 6' of the retaining ring is interrupted by keeper ribs 7' as shown, which keeper ribs perform the same function as the ribs 7 described in connection with the modified form of inner retaining ring G previously described.

By providing a collar and cup in connection with the inner packing and retaining rings as above described it is apparent that the several sectors of said packing ring can be assembled and held in their proper relation with the packed member, said sectors being held by the cup portion of the inner retaining ring from dropping out of place by gravity, with the result that they would be tightened up when not in the form of a true circle.

I claim:

1. A metallic packing comprising an inner and an outer packing ring, each formed from sectors having oppositely inclined angular outer faces and inner flat faces in tongue and groove engagement, the ends of the sectors of the inner ring being spaced apart to form radially disposed contractile recesses in conjunction with the flat faces of the outer ring, female retaining rings having angular faces for engagement with the angular faces of the packing rings, and radial ribs extending from the angular face of one of the retaining rings for interlocked loose engagement with the spaced ends of the inner packing ring against which it impinges.

2. A metallic packing comprising an inner and an outer packing ring, each formed from sectors having oppositely inclined angular outer faces and inner flat faces in tongue and groove engagement the ends of the sectors forming the inner packing ring being spaced apart to permit contraction thereof, female retaining rings having angular faces for engagement with the angular faces of the packing rings, radially disposed ribs extending from the angular face of the inner retaining ring in loose interlocked engagement with the spaced ends of said inner packing ring against which it impinges, a coiled spring in opposition to said retaining ring, and a cap in opposition to the outer retaining ring, the cap being provided with a soft metallic seating gasket for engagement with said last named retaining ring.

3. A metallic packing comprising an inner and an outer packing ring each formed from sectors having oppositely inclined angular outer faces and inner flat faces in tongue and groove engagement the ends of the sectors being spaced apart to permit contraction thereof, female retaining rings having angular faces for engagement with the angular faces of the packing rings, one of the retaining rings being provided with a circular cup, a collar extending from one of the packing rings and engageable with the cup, and radially disposed ribs extending from the angular face of the cup-retained ring for loose interlocked engagement with the spaced ends of the sectors forming the collared packing ring.

4. A metallic packing comprising an inner and an outer packing ring each formed from sectors having oppositely inclined angular outer faces and inner flat faces in tongue and groove engagement the ends of the sectors being spaced apart to permit contraction thereof, female retaining rings having angular faces for engagement with the angular faces of the packing rings, one of the retaining rings being provided with a circular cup, a collar extending from one of the packing rings and engageable with the cup, ribs extending from the angular face of the cup-retaining ring for interlocked engagement with the spaced ends of the sectors forming the collared packing ring, a coiled spring in opposition to said retaining ring, and a cap in opposition to the other retaining ring whereby said retaining rings are held in nested engagement, the cap being provided with a soft metallic seat against which said last named retaining ring impinges.

In testimony that I claim the foregoing I have hereunto set my hand at Milwaukee in the county of Milwaukee and State of Wisconsin in the presence of two witnesses.

ERNEST WISCH.

Witnesses:
CHAS. DOERING,
O. G. BRYANT.

Copies of this patent may be obtained for five cents each, by addressing the "Commissioner of Patents, Washington, D. C."